United States Patent [19]

Adahan

[11] Patent Number: 4,774,874
[45] Date of Patent: Oct. 4, 1988

[54] ROLLING DIAPHRAGM CONSTRUCTION AND PISTON-CYLINDER ASSEMBLY INCLUDING SAME PARTICULARLY USEFUL FOR SUCTION OR COMPRESSION PUMPS

[76] Inventor: Carmeli Adahan, 1316/02 Ramot 03, Jerusalem 97 725, Israel

[21] Appl. No.: 30,808

[22] Filed: Mar. 26, 1987

[51] Int. Cl.[4] ............................................. F01B 29/04
[52] U.S. Cl. ......................................... 92/59; 92/980; 92/128
[58] Field of Search .................... 92/92, 98 D, 59, 128; 417/470, 413, 395, 238

[56] References Cited

U.S. PATENT DOCUMENTS

| 3,103,855 | 9/1963 | Hager et al. | 92/98 D |
|---|---|---|---|
| 3,185,041 | 5/1965 | Stein | 92/98 D |
| 4,086,036 | 4/1978 | Hagen et al. | 417/413 |
| 4,505,188 | 3/1985 | Weydt et al. | 92/59 |
| 4,569,378 | 2/1986 | Bergandy | 92/98 D |

FOREIGN PATENT DOCUMENTS

| 1036671 | 8/1958 | Fed. Rep. of Germany | 92/98 D |
|---|---|---|---|
| 1114275 | 9/1971 | Fed. Rep. of Germany | 92/98 D |
| 571232 | 12/1957 | Italy | 417/413 |

Primary Examiner—Robert E. Garrett
Assistant Examiner—Thomas E. Denion
Attorney, Agent, or Firm—Benjamin J. Barish

[57] ABSTRACT

A rolling diaphragm for attachment between a piston and a cylinder, comprises: an inner radial section of circular configuration attachable to the piston, an outer annular skirt attachable to the cylinder, and a rolling wall between said inner radial section and said outer annular skirt. The inner face of the juncture of the inner radial section with the rolling wall is formed with an annular bead receivable within an annular groove formed in the piston for securing the inner radial section of the rolling diaphragm thereto independently of other fastening means. In addition, the outer annular skirt is formed at an intermediate portion of its outer face with an annular groove receivable over the end of an annular wall of the cylinder for clamping the outer annular skirt between the annular wall and an end wall of the cylinder, also independently of other fastening means.

8 Claims, 2 Drawing Sheets

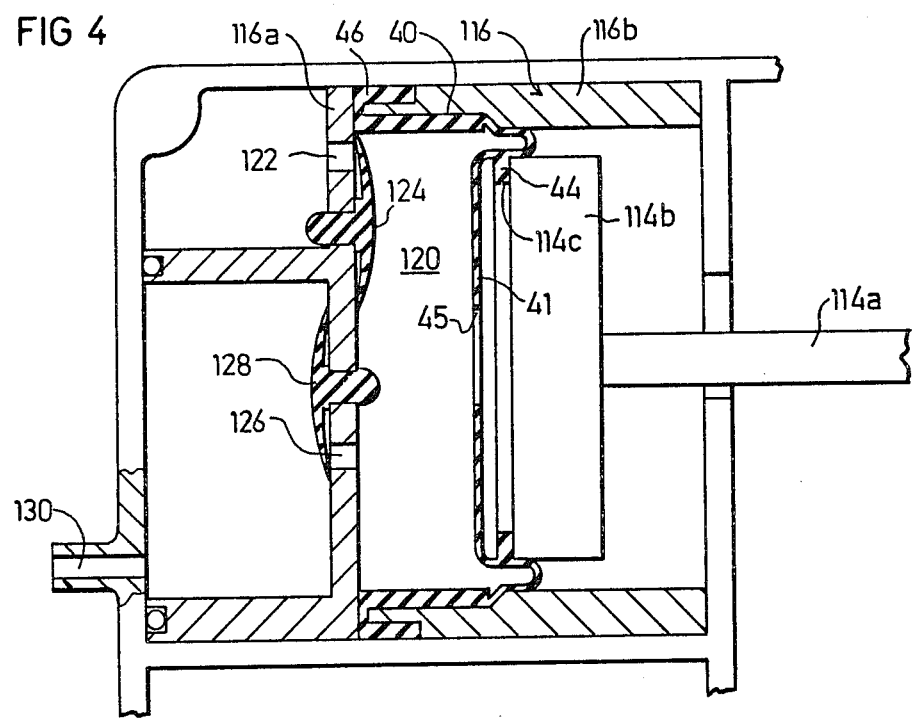
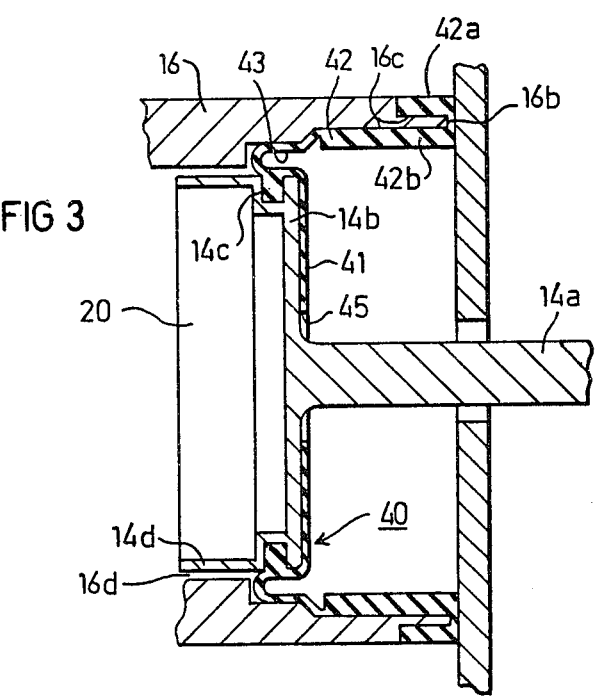

ROLLING DIAPHRAGM CONSTRUCTION AND PISTON-CYLINDER ASSEMBLY INCLUDING SAME PARTICULARLY USEFUL FOR SUCTION OR COMPRESSION PUMPS

RELATED APPLICATIONS

The present application is related to my copending patent application Ser. No. 06/833,195, now U.S. Pat. No. 4,726,745 of Feb. 27, 1986 for: Portable Fluid Pumping Device, and to my co-pending patent application Ser. No. 07/030,809 now U.S. Pat. No. 4,739,791 for: Fluid Collection Container Particularly Useful for Suction Pumps, filed the same day as this application.

BACKGROUND OF THE INVENTION

The present application relates to a rolling diaphragm construction, and to a piston-cylinder assembly including such a rolling diaphragm. The invention is particularly useful for suction or compression pumps using rolling diaphragms, for example as described in my copending patent application Ser. No. 06/833,195, and is therefore described below with respect to such pumps.

Rolling diaphragms are commonly used for coupling a piston to a cylinder, but the known constructions of rolling diaphragms usually have some or all of the following drawbacks: they require some type of independent fastener element, such as bolts or the like, to fasten them both to the piston and to the cylinder in an airtight manner; they require some bearing to center the piston, if the piston is floatingly mounted and not guided by bearings; they require a bolt pattern or key to align the piston to the cylinder in an angular relationship; they cannot be slid into place as an assembly unless they are fastened together; they tend to spring air leaks when the pressure exceeds a predetermined level; in their manufacture, they are not always easy to remove from the mould if their shape is complex; and they operate with the pressure on one side only.

An object of the present invention is to provide a rolling diaphragm having advantages in some or all of the above respects.

BRIEF SUMMARY OF THE INVENTION

According to the present invention, there is provided a rolling diaphragm for attachment between a piston and a cylinder, comprising: an inner radial section of circular configuration attachable to the piston to overlie a face of the piston head and having a surface area to cover the major portion of the piston head face, an outer annular skirt attachable to the cylinder, and a rolling wall of conical shape between the inner radial section and the outer annular skirt. The outer annular skirt is formed at an intermediate portion of its outer face with an annular groove receivable over the end of an annular wall of the cylinder for clamping the outer annular skirt between the annular wall and an end wall of the cylinder independently of other fastening means. The inner radial section of the rolling diaphragm is of stretchable material thinner than that of the rolling wall. The inner face of the inner radial section where joined to the rolling wall is formed with an annular bead receivable within an annular groove formed in the piston head for securing the inner radial section of the rolling diaphragm thereto independently of other fastening means. The inner radial section of the rolling diaphragm is further formed with a central opening enabling the rolling diaphragm to be applied to either face of the piston head.

As will be described more particularly below, a rolling diaphragm constructed in accordance with the foregoing features does not require fasteners, such as bolts, to attach it either to the piston or cylinder. In addition, it provides advantages with respect to all the other drawbacks, discussed above, generally present in the existing constructions of rolling diaphragms. The invention also provides a piston cylinder assembly including a rolling diaphragm constructed in accordance with the foregoing features.

The foregoing advantages, as well as further features of the invention, will be apparent from the description below.

BRIEF DESCRIPTION OF THE DRAWINGS

The invention is herein described, by way of example only, with reference to the accompanying drawings, wherein:

FIG. 3 illustrates the manner of applying the rolling diaphragm of FIG. 2 to the piston and cylinder in the suction pump of FIG. 1; and FIG. 4 illustrates the rolling diaphragm of FIG. 2 applied to a piston-cylinder assembly in a compression pump.

DESCRIPTION OF A PREFERRED EMBODIMENT

Figure 1:
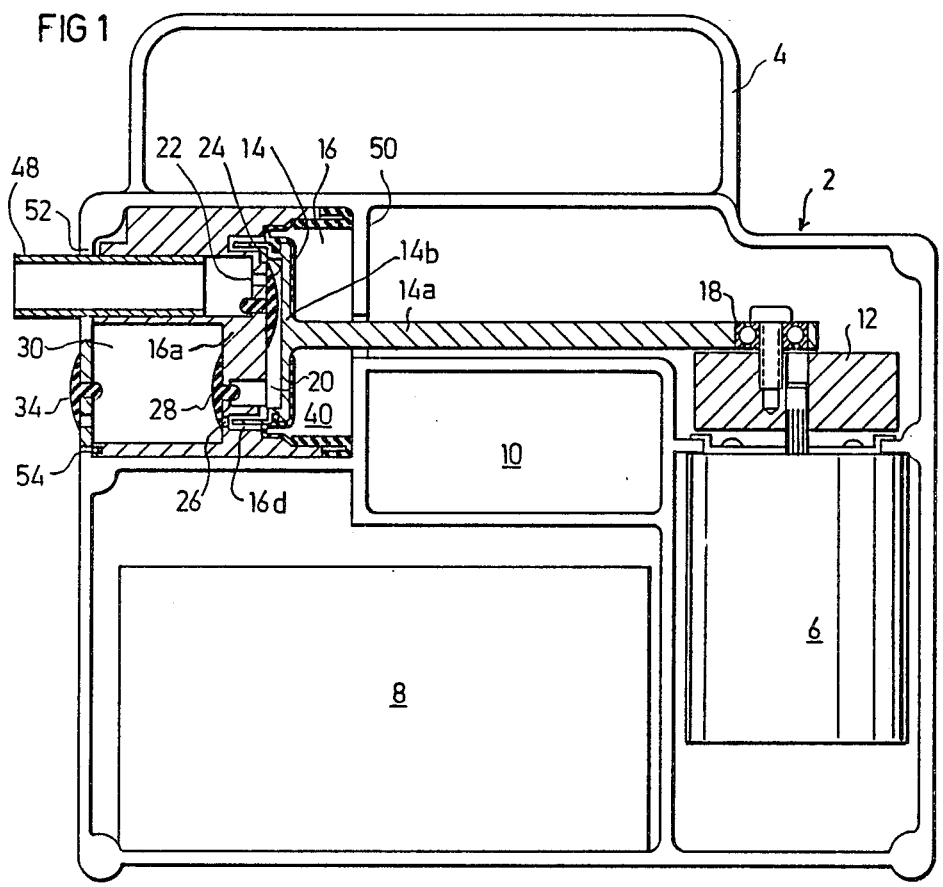
FIG. 1 diagrammatically illustrates a suction pump including a rolling diaphragm constructed in accordance with the present invention.

The suction pump illustrated in FIG. 1 is of the general type described in my co-pending application Ser. No. 06/833,195. It is intended primarily for medical applications, such as for drawing off waste fluids into a container (not shown) to be attached to the suction pump. The pump is particularly suited as an emergency stand-by medical aid which can be driven by any one of several types of power sources available at the site of use; it also includes its own battery in case no power supply is available at the site of use.

The suction pump illustrated in FIG. 1 comprises a housing, generally designated 2, having a handle 4 to facilitate carrying it from one location to another. Disposed within housing 2 is a motor 6 which may be driven by a self-contained battery 8 or by an external AC supply via a transformer 10.

Motor 6 drives a flywheel 12, which in turn reciprocates a piston 14 within a cylinder 16. Piston 14 includes a rod 14a projecting through the open end of cylinder 16 and eccentrically coupled to flywheel 12 via an eccentric bearing 18, such that the rotation of flywheel 12 reciprocates the piston head 14b within cylinder 16. Piston head 14b defines, with an end wall 16a of cylinder 16, a pumping chamber 20 which is expanded and contracted by the reciprocations of piston head 14b. End wall 16a of pumping chamber 20 is formed with an inlet port 22 closed by a one-way valve 24 of the umbrella type to permit air to enter pumping chamber 20, and with a further port 26 closed by one-way valve 28, also of the umbrella type, to permit air to exit from the pumping chamber 20. Outlet port 26 leads to an outlet chamber 30 connected to the atmosphere via a passageway 32 closed by another one-way valve 34 permitting air to pass outwardly to the atmosphere.

Outlet chamber 30 serves as a muffling chamber for reducing pump noise. The umbrella valves illustrated are also effective in reducing noise, and also in isolating the pump from the environment to protect the environment from contamination.

Figure 2:
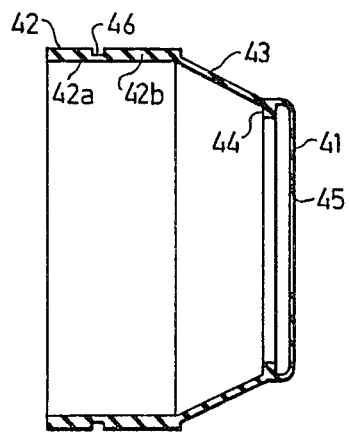
FIG. 2 illustrates the construction of the rolling diaphragm per se.

Piston head 14b of piston 14 is coupled to the cylinder 16 by means of a rolling diaphragm, generally designated 40, which seals the pumping chamber 20 and also centers the piston head within the cylinder. FIG. 2 illustrates the construction of the rolling diaphragm 40 in its unassembled state, and FIG. 3 illustrates its construction when assembled in the suction pump of FIG. 1.

As shown particularly in FIG. 2, the rolling diaphragm 40 is constituted of an inner radial section 41 of circular configuration attachable to overlie the piston head 14b; an outer annular skirt 42 attachable to the cylinder 16; and a rolling wall 43 of conical configuration between the inner radial section 41 and the outer annular skirt 42. In addition, the rolling diaphragm 40 is formed with an annular bead 44 on its inner face at the juncture of the inner radial section 41 with the rolling wall 43. Bead 44 is receivable within an annular groove 14c (FIG. 3) formed in the piston head 14b. Bead 44, when received within annular groove 14c of piston head, secures the inner radial section 41 of the rolling diaphragm across the face of the piston head independently of any other fastening means.

The inner radial section 41 of the rolling diaphragm 40 is formed with a central opening 45. This opening accommodates piston rod 14a when the rolling diaphragm is used in a piston-cylinder assembly for a suction pump, as illustrated in FIGS. 1 and 3. Opening 45 is not necessary, but does not hurt, when the rolling diaphragm is used in a piston-cylinder assembly for a compression pump, as illustrated in FIG. 4, and as will be described more particularly below.

Rolling diaphragm 40 is further formed with an annular groove 46 on the outer face of its annular skirt 42. Groove 46 is formed at an intermediate location of the annular skirt 42 but slightly closer to the free end of the annular skirt, so as to provide a skirt section 42a on the free end side of groove 46 which is slightly shorter than the skirt section 42b between the groove 46 and the rolling wall 43.

As also shown in FIG. 2, the outer annular skirt 42 of the rolling diaphragm 40 is of greater thickness than the rolling wall 43, and the rolling wall 43 is of greater thickness that the inner radial section 41. The rolling diaphragm may be formed of an elastomeric material, preferably a natural or synthetic rubber, by injection moulding.

FIG. 3 illustrates the manner of applying rolling diaphragm 40 to the piston-cylinder assembly used as a suction pump, as illustrated in FIG. 1. In such an application, the pumping chamber 20 is subjected to a sub-atmospheric pressure when the chamber is in its expanded position, to apply suction to the container (not shown) connected to the inlet port 22 via suction tube 48 (FIG. 1). Accordingly, the inner radial section 41 of the rolling diaphragm 40 is applied to the outer face of piston head 14b, e.g., to the face opposite to that facing the pumping chamber 20, so that the sub-atmospheric pressure produced within that chamber will enhance the seal of the rolling diaphragm with respect to piston head 14b.

Rolling diaphragm 40 is first applied to piston head 14b by passing piston rod 14a through central opening 45 of the rolling diaphragm, then stretching the inner radial section 41 across the outer face of piston head 14b, and then seating bead 44 into annular groove 14c formed in the piston head. This will keep the rolling diaphragm bead 44 tightly in the piston groove 14c even when the pressures are reversed and the diaphragm reciprocates at a high rate.

Diaphragm skirt 42 is then rolled over the inner surface of cylinder 16, and the annular groove 46 formed in skirt 42 is inserted into the free end 16b of the cylinder 16. The outer free end 42a of skirt 42 is inserted within an annular recess 16c formed in the outer surface of cylinder 16, whereas the inner skirt section 42b lines the inner surface of the cylinder.

Cylinder 16, with piston 14 attached by the rolling diaphragm 40, may then be slid between the two walls 50, 52 (FIG. 1). Wall 50 engages the diaphragm skirt 42 on opposite sides of its annular groove 46, thereby fixing and sealing that end of the diaphragm independently of any further fasteners. The opposite end of cylinder 16 is provided with a sealing ring 54 which seals that end with respect to the opposite wall 52.

Piston 14 is further formed with a cylindrical wall 14d extending axially of cylinder 16 towards wall 52; and the adjacent inner surface 16d (FIGS. 1 and 3) of cylinder 16 is of larger diameter than that of the outer cylindrical wall 14d so as to accommodate the latter wall with ample clearance. The purpose of cylindrical wall 14d is to prevent the diaphragm from buckling when pumping chamber 20 is in its expanded condition and under relatively high sub-atmospheric pressure.

It will thus be seen that the diaphragm 40 is applied to the piston 14 and cylinder 16 without any further fastening means. The diaphragm maintains the piston centrally within the cylinder. A sub-atmospheric pressure in the pumping chamber 20 tends to stretch the diaphragm towards the pumping chamber, thereby tightening the seal provided by the diaphragm with respect to the piston head and cylinder. In addition, cylindrical wall 14d prevents the diaphragm from buckling when the pumping chamber 20 is in it expanded condition under high sub-atmospheric pressure.

Further, the diaphragm can be keyed angularly to both the piston 14 and cylinder 16 by way of appropriate holes and protrusions on the mating parts (not shown), to provide a fixed angular relationship between the piston and cylinder. Also, since the small diameter end of the conical rolling wall 43 is larger than the outer diameter of bead 44, this prevents the diaphragm from stretching against the piston once the bead is stretched in place, leaving the rolling wall free to roll during the reciprocation of the piston. Still further, the diaphragm is easy to extract from the mould since the bead 44 keeps it attached to the male portion of the mould which, when extracted, peels the diaphragm off the female portion of the mould.

FIG. 4 illustrates the rolling diaphragm 40 of FIG. 2 applied to a piston-cylinder assembly used in a compression pump. Thus, the compression pump illustrated in FIG. 4 includes a piston 114 having a piston rod 114a and a piston head 114b, movable within a cylinder 116 defining a pumping chamber 120 with end wall 116a of the cylinder. Pumping chamber 120 in the FIG. 4 assembly is a compression chamber, i.e. it produces a super-atmospheric pressure within it when the chamber is in its contracted condition. For this purpose, end wall 116a of the cylinder is formed with an inlet port 122 exposed to the atmosphere and controlled by a one-way valve 124 of the umbrella type permitting air to pass into the pumping chamber 120, and an outlet port 126 controlled by a one-way valve 128 permitting air to pass outwardly from the compression chamber 120 via nipple 130 to the device (not shown) to receive the compressed air.

The compression-pump arrangement illustrated in FIG. 4 utilizes the identical rolling diaphragm 40 illustrated in FIG. 2 as included in the suction-pump arrangement of FIGS. 1 and 3; and when so used, it provides the same advantages as discussed above with respect to the suction-pump arrangement.

Thus, the radial section 41 of the diaphragm is applied over the piston head 114b, except in this case over the face facing the pumping chamber 120; and the bead 44 is inserted within an annular groove 114c formed in the side wall of the piston head. This arrangement neither requires, nor is affected by, the central opening 45, provided in inner radial section 41 to accommodate the piston rod when the diaphragm is used in the suction pump configuration as described above with respect to FIGS. 1 and 3.

The end of the annular wall 116b defining the side wall of cylinder 116 is then inserted into groove 46 of the diaphragm and pressed against the end wall 116a so as to firmly and sealingly clamp the diaphragm within the cylinder.

It will thus be seen that no external fasteners are required for securing, in a seal-type manner, the rolling diaphragm 40 to the piston head 114b and the cylinder 116, and that the positive pressure produced within pumping chamber 120 during the operation of the pump enhances this seal. It will also be seen that the other advantages described above with respect to the use of the illustrated rolling diaphragm in the suction pump of FIGS. 1 and 3 also apply with respect to its use in the compression pump illustrated in FIG. 4.

While the invention has been described with respect to one preferred embodiment, it will be appreciated that many other variations, modifications and applications of the invention may be made.

What is claimed is:

1. A rolling diaphragm for attachment between a piston head of circular configuration and a cylinder, comprising: an inner radial section of circular configuration attachable to the piston to overlie a face of the piston head and having a surface area to cover the major portion of the piston head face, an outer annular skirt attachable to the cylinder, and a rolling wall of conical shape between said inner radial section and said outer annular skirt; said outer annular skirt being formed at an intermediate portion of its outer face with an annular groove receivable over the end of an annular wall of the cylinder for clamping said outer annular skirt between said annular wall and an end wall independently of other fastening means; said inner radial section being of stretchable material thinner than that of said rolling wall; the inner face of said inner radial section where joined to said rolling wall being formed with an annular bead receivable within an annular groove formed in the piston head for securing the inner radial section of the rolling diaphragm thereto independently of other fastening means; said inner radial section being formed with a central opening enabling the rolling diaphragm to be applied to either face of the piston head.

2. A piston-cylinder assembly, comprising: a cylinder having an annular wall open at one end; a piston including a piston head of circular configuration movable in said cylinder and a piston rod projecting through the open end of said cylinder; and a rolling diaphragm coupling said piston to said cylinder and comprising an inner radial section of circular configuration attached to the piston to overlie a face of the piston head and having a surface area covering the major portion of the piston head face, an outer annular skirt attached to the cylinder, and a rolling wall of conical shape between said inner radial section and said outer annular skirt; said outer annular skirt being formed at an intermediate portion of its outer face with an annular groove receivable over the end of said annular wall of the cylinder for clamping said outer annular skirt between said annular wall and an end wall of the assembly independently of other fastening means; said inner radial section being of stretchable material thinner than that of said rolling wall; said piston head being formed with an annular groove; the inner face of said inner radial section of the rolling diaphragm where joined to said rolling wall being formed with an annular bead receivable within said annular groove for securing the inner radial section of the rolling diaphragm to the piston head independently of other fastening means; said inner radial section being formed with a central opening enabling the rolling diaphragm to be applied to either face of the piston head.

3. A pump including a piston-cylinder assembly according to claim 2, wherein the piston head and the closed end of the cylinder define a pumping chamber, said closed end of the cylinder including an inlet port having a one-way valve permitting fluid to flow into said pumping chamber, and an outlet port having a one-way valve permitting fluid to flow out of said pumping chamber.

4. The pump according to claim 3, wherein the pump is a suction pump, said inner radial section of the rolling diaphragm being attached to overlie the face of said piston head opposite to that facing said pumping chamber with its central opening accommodating said piston rod.

5. The pump according to claim 4, wherein the face of the piston head facing said pumping chamber is formed with an axially-extending cylindrical wall receivable within an annular recess formed in said cylinder during the contracted condition of the pumping chamber to prevent bucking of the rolling wall of the rolling diaphragm.

6. The pump according to claim 4, wherein said annular wall of the cylinder is received between a pair of end walls, one end wall clamping the rolling diaphragm outer annular skirt to the annular wall and being formed with a passageway for the piston rod, the other end wall being formed with passageways for the inletted and outletted fluid with respect to the pumping chamber.

7. The pump according to claim 3, wherein said pump is a compression pump, said inner radial section of the rolling diaphragm being attached to overlie the face of the said piston head facing said pumping chamber.

8. The pump according to claim 7, wherein said cylinder includes a cylindrical wall and an end wall, said annular groove of the rolling diaphragm annular skirt being received within the end of the cylindrical wall and being clamped thereto by said end wall.

\* \* \* \* \*